2,726,733

PRODUCTION OF HYDROGEN CYANIDE

Harold H. Radke and Carl H. Kotheimer, Lorain, Ohio, assignors to The B. F. Goodrich Company, New York, N. Y., a corporation of New York No Drawing. Application December 6, 1951, Serial No. 260,302

2 Claims. (Cl. 183—114.2)

This invention relates to the production of hydrogen cyanide. More particularly, it relates to an improved method for recovering unreacted ammonia from product gases containing hydrogen cyanide and resulting from the reaction of ammonia and a gaseous hydrocarbon rich in methane, together with the requisite amount of oxygen, at a high temperature.

Hydrogen cyanide is generally produced on plant scale from natural gas, ammonia and air in the manner generally outlined by Andrussow in U. S. Patent 1,934,838. By this method, hydrogen cyanide results from the exothermic catalytic reaction of gaseous ammonia, at least one hydrocarbon, particularly methane, and oxygen, at elevated temperatures over an oxidation catalyst. The reaction of ammonia and a hydrocarbon is normally an endothermic one requiring a large amount of external heat, but instead of externally applying the heat necessary the Andrussow method converts the reaction into an exothermic one by the addition of the requisite amount of oxygen which produces the heat necessary for the reaction by combusting the hydrocarbon.

In the above-mentioned process, the oxidation catalyst used may be a platinum metal or alloy such as platinum-rhodium and platinum-iridium alloys. Such platinum catalysts are preferably used in the form of one or more layers of fine wire gauze of the catalytic material through which the reactant gases are passed. The reaction is effected at high temperatures, such as, for example, of the order of 900 to 1400° C., preferably at about 1100–1200° C.

The product gases which leave the catalyst zone contain not only hydrogen cyanide but also such gases as carbon monoxide, hydrogen, water vapor and nitrogen, as well as unreacted hydrocarbon and ammonia. The unreacted ammonia must be removed from the product gases in order to avoid subsequent polymerization of hydrogen cyanide. Even small traces of ammonia can cause considerable polymerization of hydrogen cyanide with the formation of a tarry, gummy material, which leads to plugged lines and equipment. This results not only in a decrease in the yield of the desired product but also in a decrease in the efficiency of the plant as a whole.

In conventional plant practice the ammonia is removed from the product gases by contacting the gases with sulfuric acid to convert the ammonia into ammonium sulfate after which the hydrogen cyanide is absorbed in water and the solution distilled to give hydrogen cyanide of high purity. This practice however does not permit of recovery of ammonia as such and in addition some hydrogen cyanide is lost by solution in the ammonium sulfate solution.

It is an object of this invention to provide a method whereby unreacted ammonia can be completely removed from the gases and recovered as such, without substantial loss of hydrogen cyanide either by dissolution or subsequent polymerization and without impairment of the efficiency of operation of the process.

We have now found that these objectives may be accomplished by process steps in which ammonia is specifically and completely adsorbed from the gases and recovered from the adsorbent. More specifically, we have found that the unconverted ammonia can be recovered from the product gases by the use of acidic silica gel as a specific adsorbent for the ammonia.

In practicing our invention the product gases from the reaction of methane-rich hydrocarbon gases, ammonia and air over a platinum catalyst, which product gases contain hydrogen cyanide and unreacted ammonia are contacted with acidic silica gel preferably by passing the gases upward through a tower or column packed with acidic silica gel preferably of 6–16 mesh size. The temperature of the gases entering the column is not critical but it is preferred that the column be operated so as to avoid water condensation from the gases during adsorption. If the product gases be cooled to below 100° C., as by passing through a heat exchanger, after leaving the catalyst and before being led into the column, as is ordinarily preferred, it may be desirable to heat the entrance section of the column to reduce the amount of possible water condensation and periodically to drain any water which does condense, eliminating contact of the condensate with the feed gases. These precautions are desirable in order to avoid as far as possible contact of hydrogen cyanide, ammonia and liquid water since hydrogen cyanide and ammonia react in solution in water but do not react in the vapor phase.

During passage through the column the silica gel preferentially adsorbs the ammonia without adsorbing substantial proportions of hydrogen cyanide. During the first few minutes of operation a small amount of hydrogen cyanide is adsorbed but thereafter hydrogen cyanide passes through the column and only ammonia is adsorbed. Passage of gases through the column is continued until the "break-point," or point where ammonia is adsorbed at a greatly reduced rate, is reached. The time required to reach the break point depends of course upon the size of the column, the ammonia content of the product gases, the space velocity of the gases and other operating conditions, but is usually in the range of 1 to 3 hours. The break point can be determined readily, for example, by bubbling the gas from the adsorption column through 0.5 N hydrochloric acid and observing the point at which the hydrochloric acid is neutralized by the ammonia coming through the silica gel. At this point the flow of gases may be switched to another similar column while the adsorbed ammonia in the first column is recovered.

To recover the ammonia adsorbed and to regenerate the silica gel for re-use, the entire column containing the silica gel is heated preferably to 175 to 200° C. and a stream of air passed downward through the column. Other methods of removing $NH_3$ from the silica gel may be used, such as by passing heated air, superheated steam or other heated inert gas through the column. The ammonia thus liberated may be absorbed in water, stripped from the water solution and then compressed, ready for re-use in reaction with methane and oxygen to give more hydrogen cyanide. The desorption of ammonia from the silica gel is quite rapid and is substantially completed by passing air through the heated column for only about 30 to 60 minutes' time.

As an illustrative example of the process described above, a mixture of purified natural gas containing about 96% methane, ammonia and air in the ratio of moles methane to moles ammonia of 1.13 and moles of oxygen to moles ammonia of 1.50, is passed over a platinum-rhodium catalyst operating at about 1200° C. The conversion of ammonia to hydrogen cyanide is about 75% and the product gases are composed of hydrogen cyanide, nitrogen, hydrogen, unreacted ammonia and methane and small amounts of carbon dioxide, carbon monoxide and oxygen, with about 7% being hydrogen cyanide and about 1.6% being unreacted ammonia. This product gas stream is cooled and passed upward through a column packed with 6–16 mesh acidic silica gel, at a space velocity (volume of gas per hour per volume of adsorbent) of 1330 and at a rate such that 0.071 mole of ammonia is passed through the column per hour. The column is operated for a period of 1 hour and 35 minutes. Hydrogen cyanide analyses made on the effluent gases at 10 minutes and 20 minutes after start up reveal that 50% of the available hydrogen cyanide comes through the column after 10 minutes' operation but that no hydrogen cyanide is being adsorbed after 20 minutes.

After stopping the passing of gases through the column, the column is heated to 200° C. and a stream of air passed downward therethrough for a period of 30 minutes. The ammonia recovered is absorbed in water and its amount determined by neutralization with hydrochloric acid. In this manner, it is found that 0.1122 mole of ammonia or 100% of the theoretical amount (0.071 mole per hour for 1 hour and 35 minutes) is recovered. The amount of hydrogen cyanide evolved on silica gel regeneration is also determined and it is found that only about 2% of the hydrogen cyanide is adsorbed.

The gases unadsorbed in the silica gel column are further treated to recover hydrogen cyanide in substantially pure form. This is readily accomplished by absorbing the hydrogen cyanide in water, and distilling the water solution to produce hydrogen cyanide of 98.5 to 99% purity. Since ammonia is removed the absorption in water does not result in polymerization and loss of the hydrogen cyanide, which is the case when ammonia is present at the time of the water absorption step.

The advantages of the method of this invention for the recovery of the unconverted ammonia are readily apparent. In the process for the production of hydrogen cyanide from ammonia, a hydrocarbon, such as methane, and oxygen, the most expensive raw material is the ammonia. Since we are able to separate the unreacted ammonia from the product gases of the converter in such a way that it can be re-used in the process, the over-all yield of hydrogen cyanide based on the ammonia required is increased. Further, because the recovery method of our invention is economical, the over-all cost of the process is thereby reduced. Thus, we are able to provide an increase in the yield of the desired hydrogen cyanide and a more efficient process.

While the invention has been described with particular reference to certain preferred embodiments thereof, it is possible to make variations and modifications therein without departing from the spirit and scope of the invention as defined in the appended claims.

We claim:

1. The method of separating ammonia from hydrogen cyanide present in the mixed gas effluent resulting from the reaction of a gaseous hydrocarbon, ammonia and a gas comprising free oxygen in the presence of a platinum catalyst at an elevated temperature, comprising passing the mixed gas effluent at a temperature above the condensation point of water through an adsorbing column containing acidic silica gel to adsorb the ammonia and permit the hydrogen cyanide vapor to pass through the column with only slight adsorption, and recovering separately the unadsorbed hydrogen cyanide and the adsorbed ammonia.

2. The method of separating ammonia from hydrogen cyanide present in the mixed gas effluent resulting from the reaction of a gaseous hydrocarbon, ammonia and a gas comprising oxygen at elevated temperatures in the presence of a platinum alloy catalyst comprising passing the mixed gas effluent at a temperature above the condensation point of water through an adsorbing column containing acidic silica gel to adsorb preferentially all of the ammonia and only a small proportion of the hydrogen cyanide, recovering the unadsorbed cyanide and recovering the adsorbed ammonia from the spent silica gel by passing a stream of air through the spent gel at a temperature of 175 to 200° C.

References Cited in the file of this patent

UNITED STATES PATENTS

| | | |
|---|---|---|
| 1,787,875 | Perrott et al. | Jan. 6, 1931 |
| 1,934,838 | Andrussow | Nov. 14, 1933 |
| 2,105,831 | Andrussow | Jan. 18, 1938 |